United States Patent
Horikawa et al.

(10) Patent No.: US 10,024,414 B2
(45) Date of Patent: Jul. 17, 2018

(54) SPEED REDUCTION MECHANISM, MOTOR WITH SPEED REDUCTION MECHANISM, AND METHOD FOR PRODUCING SPEED REDUCTION MECHANISM

(71) Applicant: ASMO CO., LTD., Kosai-shi, Shizuoka-ken (JP)

(72) Inventors: Masaya Horikawa, Hamamatsu (JP); Hideyuki Yagi, Toyohashi (JP); Itaru Soga, Toyohashi (JP)

(73) Assignee: DENSO CORPORATION, Aichi-Pref. (JP)

( * ) Notice: Subject to any disclaimer, the term of this patent is extended or adjusted under 35 U.S.C. 154(b) by 394 days.

(21) Appl. No.: 14/841,925

(22) Filed: Sep. 1, 2015

(65) Prior Publication Data

US 2015/0369353 A1    Dec. 24, 2015

Related U.S. Application Data

(63) Continuation of application No. 13/635,319, filed as application No. PCT/JP2011/056035 on Mar. 15, 2011, now Pat. No. 9,154,015.

(30) Foreign Application Priority Data

Mar. 24, 2010 (JP) ................................. 2010-068383

(51) Int. Cl.
*F16H 1/16*    (2006.01)
*F16H 55/22*    (2006.01)
(Continued)

(52) U.S. Cl.
CPC ............ *F16H 55/22* (2013.01); *F16H 55/06* (2013.01); *F16H 55/088* (2013.01);
(Continued)

(58) Field of Classification Search
CPC ....... F16H 55/22; F16H 55/06; F16H 55/0853
See application file for complete search history.

(56) References Cited

U.S. PATENT DOCUMENTS 1,525,642 A    2/1925    Cox
1,790,607 A    1/1931    Trbojevich
(Continued)

FOREIGN PATENT DOCUMENTS

CN    201083251    7/2008
DE    4041567    6/1992
(Continued)

OTHER PUBLICATIONS

International Search Report for related PCT Application No. PCT/JP2011/056035 dated May 17, 2011.
(Continued)

*Primary Examiner* — David M Fenstermacher
(74) *Attorney, Agent, or Firm* — Caesar Rivise, PC

(57) ABSTRACT

A pressure angle of the worm is set to be greater than a pressure angle of the worm wheel so that a maximum number of meshing teeth becomes smaller than or equal to n (where n is a natural number) with respect to the speed reduction mechanism in which a number of meshing teeth is always n+1 or changed between n+1 and n by rotation under a condition in which the pressure angles of the worm and the worm wheel are the same with respect to each other.

6 Claims, 7 Drawing Sheets

(51) Int. Cl.
*F16H 55/08* (2006.01)
*H02K 7/116* (2006.01)
*F16H 55/06* (2006.01)

(52) U.S. Cl.
CPC ..... *F16H 55/0853* (2013.01); *F16H 55/0886* (2013.01); *H02K 7/1166* (2013.01); *F16H 1/16* (2013.01); *Y10T 29/49826* (2015.01); *Y10T 74/19828* (2015.01); *Y10T 74/19842* (2015.01)

(56) References Cited

U.S. PATENT DOCUMENTS

| | | | |
|---|---|---|---|
| 4,825,715 A | 5/1989 | Buczek et al. | |
| 5,389,183 A | 2/1995 | Seki et al. | |
| 6,247,376 B1 | 6/2001 | Zhou et al. | |
| 6,571,655 B2 * | 6/2003 | Tanaka | F16H 55/0806 74/457 |
| 6,976,556 B2 | 12/2005 | Shimizu et al. | |
| 7,174,865 B2 | 2/2007 | Sakita | |
| 7,484,438 B2 | 2/2009 | Murphy | |
| 7,721,616 B2 * | 5/2010 | Augustine | F16H 1/16 74/352 |
| 7,798,033 B2 * | 9/2010 | Oberle | B62D 5/0409 74/388 PS |
| 7,926,381 B2 * | 4/2011 | Grosskopf | F16H 55/0806 310/83 |
| 8,051,737 B2 * | 11/2011 | Li | F16H 1/16 74/425 |
| 8,100,028 B2 * | 1/2012 | Miyaoku | F16H 55/08 74/462 |
| 8,250,940 B2 * | 8/2012 | Ozsoylu | F16H 55/24 74/409 |
| 8,408,353 B2 * | 4/2013 | Nagase | B62D 5/0406 180/443 |
| 9,327,357 B2 * | 5/2016 | Nagata | B23F 5/163 |
| 2004/0026160 A1 | 2/2004 | Shimizu et al. | |
| 2007/0227279 A1 | 10/2007 | Watanabe et al. | |
| 2007/0295135 A1 | 12/2007 | Kidowaki | |
| 2014/0291063 A1 | 10/2014 | Kim | |

FOREIGN PATENT DOCUMENTS

| | | |
|---|---|---|
| JP | 10-220561 | 8/1998 |
| JP | 2000-097293 | 4/2000 |
| JP | 2002-139127 | 5/2002 |
| JP | 2004-066947 | 3/2004 |
| JP | 2005-003099 | 1/2005 |
| JP | 2006-177426 | 7/2006 |
| JP | 2009-047267 | 3/2009 |
| RU | 2291337 | 1/2007 |

OTHER PUBLICATIONS

International Preliminary Report on Patentability for related PCT/JP2011/056035 dated Mar. 6, 2012.
Office Action dated Apr. 27, 2015 for related Chinese Application.

* cited by examiner

SPEED REDUCTION MECHANISM, MOTOR WITH SPEED REDUCTION MECHANISM, AND METHOD FOR PRODUCING SPEED REDUCTION MECHANISM

CROSS REFERENCE TO RELATED APPLICATIONS

This continuation application claims the benefit under 35 U.S.C. § 120 of application Ser. No. 13/635,319 filed on Sep. 14, 2012 entitled SPEED REDUCTION MECHANISM, MOTOR WITH SPEED REDUCTION MECHANISM, AND METHOD FOR PRODUCING SPEED REDUCTION MECHANISM, which in turn is a U.S. national phase application claiming the benefit of 35 U.S.C. § 371 of international application no. PCT/JP2011/056035 filed on Mar. 15, 2011 which in turn claims the benefit of Japanese application no. JP 2010-068383 filed on Mar. 24, 2010, and all of whose entire disclosures are incorporated by reference herein.

FIELD OF THE INVENTION

The present invention relates to a speed reduction mechanism including a worm and a worm wheel, a motor with the speed reduction mechanism, and a method for producing the speed reduction mechanism.

BACKGROUND ART

As shown FIG. 5(a) and FIG. 5(b), a speed reduction mechanism including a worm 51 and a worm wheel 52 is conventionally proposed. In such a speed reduction mechanism, pressure angles of the worm 51 and the worm wheel 52 are typically set to the same value (e.g., α°) with respect to each other. Patent document 1 discloses a speed reduction mechanism for reducing a wear volume by setting the pressure angle of the worm greater than the pressure angle of the worm wheel.

PRIOR ART DOCUMENT

Patent Document

Patent document 1: Japanese Laid-Open Patent Publication No. 2002-139127

SUMMARY OF THE INVENTION

Problems to be Solved by the Invention

The speed reduction mechanism of patent document 1 reduces the wear volume by setting the pressure angle of the worm slightly greater than the pressure angle of the worm wheel. However, in such a speed reduction mechanism, a great loss of the rotation force mainly due to kinetic friction occurs at the meshing portion thus degrading the transmission efficiency of the rotation force, and hence enhancement in the transmission efficiency of the rotation force is desired. In particular, in the motor with the speed reduction mechanism including such a speed reduction mechanism as discussed above, the efficiency of the motor may degrade with degradation in the transmission efficiency of the rotation force and the desired speed reduction efficiency may not be obtained. The enhancement in the transmission efficiency of the rotation force is thus desired.

It is an object of the present invention to provide a speed reduction mechanism with satisfactory transmission efficiency of the rotation force, a motor with the speed reduction mechanism, and a method for producing the speed reduction mechanism.

To achieve the above object, one aspect of the present invention provides a speed reduction mechanism including a worm and a worm wheel. The worm wheel meshes with the worm. A pressure angle of the worm is set to be greater than a pressure angle of the worm wheel so that a maximum number of meshing teeth becomes smaller than or equal to n (where n is a natural number) with respect to the speed reduction mechanism in which a number of meshing teeth is always n+1 or changed between n+1 and n by rotation under a condition in which the pressure angles of the worm and the worm wheel are the same with respect to each other.

According to the above configuration, in the worm and worm wheel in which a number of meshing teeth is always n+1 or changed between n+1 and n by rotation under a condition in which the pressure angles of the worm and the worm wheel are the same with respect to each other, the surface pressure with respect to each tooth lowers when the number of meshing teeth increases, whereby the friction coefficient increases and the power loss at the meshing portion increases. In the configuration as discussed above, however, the pressure angle of the worm is set to be greater than the pressure angle of the worm wheel so that the maximum number of meshing teeth becomes smaller than or equal to n, and hence the number of meshing teeth will not be n+1. Thus, the power loss can be reduced, and furthermore, the rotation transmission efficiency can be enhanced.

Preferably, the pressure angle of the worm is set to be greater than the pressure angle of the worm wheel so that the maximum number of meshing teeth becomes smaller than or equal to four with respect to the speed reduction mechanism in which the number of meshing teeth is always five or changed between five and four by rotation under a condition in which the pressure angles of the worm and the worm wheel are the same with respect to each other.

According to the above configuration, in the worm and worm wheels in which the number of meshing teeth is always five or changed between five and four by rotation under a condition in which the pressure angles of the worm and the worm wheel are the same with respect to each other, the surface pressure with respect to each tooth lowers when the number of meshing teeth increases to five, whereby the friction coefficient increases and the power loss at the meshing portion increases. In the configuration as discussed above, however, the pressure angle of the worm is set to be greater than the pressure angle of the worm wheel so that the maximum number of meshing teeth becomes smaller than or equal to four, and hence the number of meshing teeth will not be five. Thus, the power loss can be reduced, and furthermore, the rotation transmission efficiency can be enhanced.

Preferably, the pressure angle of the worm is set to a maximum angle while satisfying a relationship of the worm and the worm wheel.

According to the above configuration, the pressure angle of the worm is set to the maximum angle, while satisfying the relationship of the worm and the worm wheel, that is, within a range in which the worm and the worm wheel function as the worm gear, and hence an average of the number of meshing teeth can be a minimum. Thus, the power loss can be greatly reduced, and furthermore, the rotation transmission efficiency can be greatly enhanced.

Preferably, a motor with a speed reduction mechanism includes the speed reduction mechanism having above discussed configuration and a motor main body for rotatably driving the worm.

According to the above configuration, efficiency in the motor with the speed reduction mechanism can be enhanced.

Preferably, a manufacturing method of a speed reduction mechanism including a worm and a worm wheel is provided. A pressure angle of the worm is set to be greater than a pressure angle of the worm wheel so that a maximum number of meshing teeth becomes smaller than or equal to n (where n is a natural number) with respect to the speed reduction mechanism in which a number of meshing teeth is always n+1 or changed between n+1 and n by rotation under a condition in which the pressure angles of the worm and the worm wheel are the same with respect to each other.

According to the above method, in the worm and worm wheel in which a number of meshing teeth is always n+1 or changed between n+1 and n by rotation under a condition in which the pressure angles of the worm and the worm wheel are the same with respect to each other, the surface pressure with respect to each tooth lowers when the number of meshing teeth increases, whereby the friction coefficient increases and the power loss at the meshing portion increases. In the speed reduction mechanism produced by the method as discussed above, however, the pressure angle of the worm is set to be greater than the pressure angle of the worm wheel so that the maximum number of meshing teeth becomes smaller than or equal to n, and hence the number of meshing teeth will not be n+1. Thus, the power loss can be reduced, and furthermore, the rotation transmission efficiency can be enhanced.

DETAILED DESCRIPTION OF THE PREFERRED EMBODIMENTS

One embodiment embodying the present invention will be hereinafter described according to FIG. 1 to FIG. 4(b).

Figure 1:
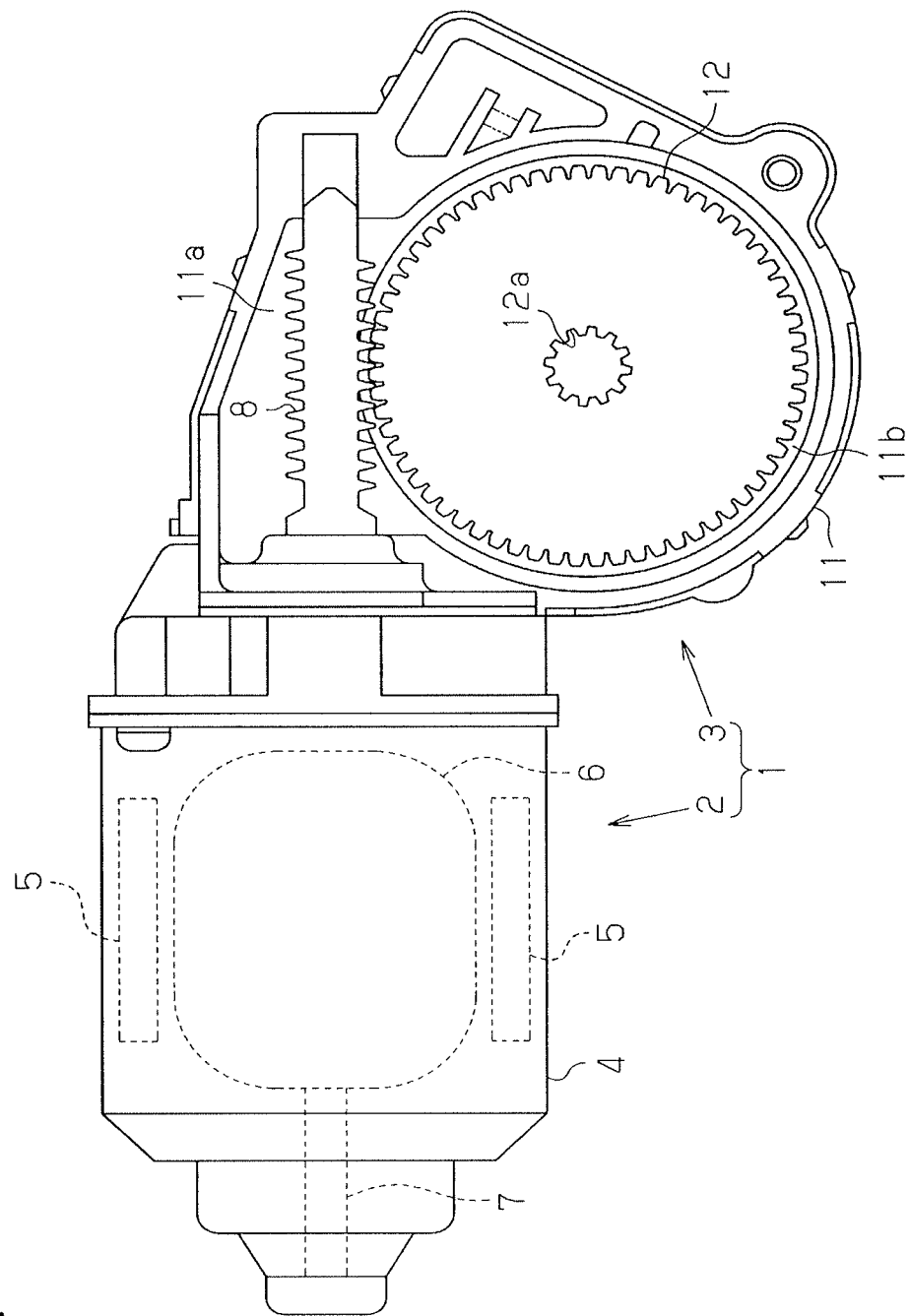
FIG. 1 is a schematic view of a motor with a speed reduction mechanism according to one embodiment of the present invention.
Figure 2:
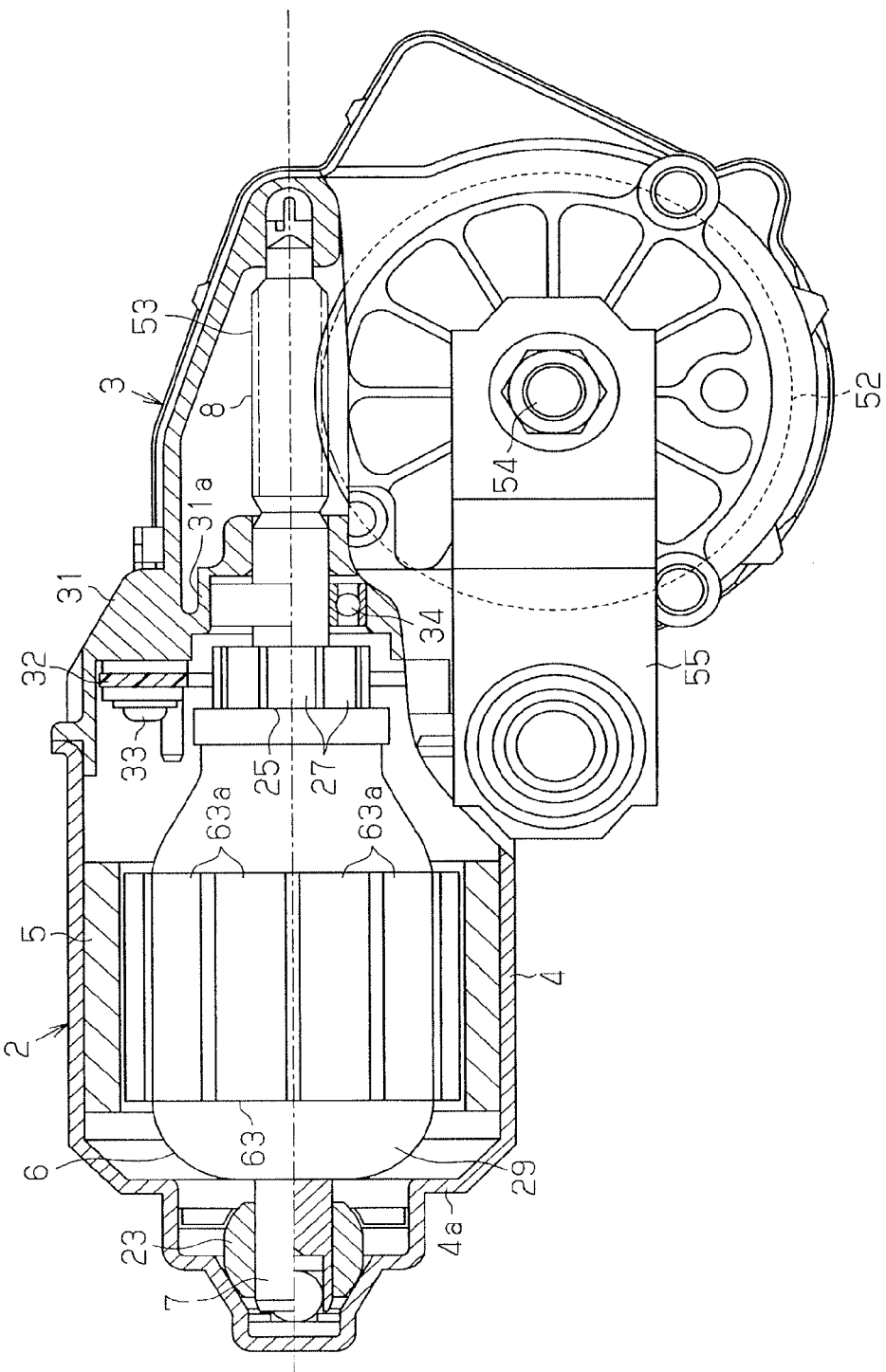
FIG. 2 is a schematic view showing a configuration of a motor main body of FIG. 1.

As shown in FIGS. 1 and 2, a motor 1 with a speed reduction mechanism includes a motor main body 2 and a gear unit 3. The motor 1 is used as a drive source for a vehicle wiper (not shown) that wipes a front glass and the like of the vehicle.

The motor main body 2 includes a tubular yoke housing 4 with a bottom portion 4a. At least one magnet 5 having four magnetic pole portions (two N poles and two S poles) is securely attached to an inner circumferential surface of the yoke housing 4. In other words, the motor main body 2 includes two magnetic circuits. In the magnet 5, the N pole and the S pole are alternately arranged in the circumferential direction of the yoke housing 4.

A rotor 6, which is an armature, is rotatably arranged on a radially inner side of the magnet 5. The rotor 6 includes a rotation shaft 7, a rotor core 63, and a commutator 25. A basal end of the rotation shaft 7 positioned near to the bottom portion 4a of the yoke housing 4 is supported by a bearing 23 arranged at a center of the bottom portion 4a. A distal end of the rotation shaft 7 extends toward the gear unit 3 from an opening of the yoke housing 4.

The rotor core 63 is arranged at a position facing the magnet 5 in a radial direction, and is fixed to the rotation shaft 7 so as to be integrally rotatable. The rotor core 63 includes 18 teeth 63a radially extending towards the radially outer side with the rotation shaft 7 as a center. A slot 63b is formed in a space between the teeth 63a adjacent to each other in the circumferential direction of the rotor core 63 (see FIG. 3).

The commutator 25 is fixed in an integrally rotatable manner to a portion of the rotation shaft 7 located nearer to the gear unit 3 than the rotor core 63. The commutator 25 includes a cylindrical insulating body (not shown) made of insulating resin material and externally fitted to the rotation shaft 7, and 18 segments 27 securely attached to an outer circumferential surface of the insulating body. Each segment 27 has a rectangular plate shape that is long in the axial direction of the rotation shaft 7, and is curved along the outer circumferential surface of the insulating body. The 18 segments 27 are lined at an equal angular interval in the circumferential direction and are arranged to form a substantially cylindrical shape as a whole. The segments 27 adjacent to each other in the circumferential direction of the rotation shaft 7 are spaced apart in the circumferential direction of the rotation shaft 7.

As shown in FIG. 2, the gear unit 3 includes a gear housing 11 coupled to and fixed with an opening edge of the yoke housing 4. The gear housing 11 has an opening portion opened toward the yoke housing 4. A brush holder 32 arranged on the radially outer side of the commutator 25 is fixed to such opening portion with a screw 33. The brush holder 32 is made of an insulating resin material and has a circular shape.

As shown in FIG. 2, a cylindrical bearing holder 31a extending along the axial direction of the rotation shaft 7 is arranged at the opening portion of the gear housing 11. A circular shaped bearing 34 for supporting substantially a central part of the rotation shaft 7 is accommodated in the bearing holder 31a. In the present embodiment, a ball bearing is used for the bearing 34. This is because if a slide bearing such as a sintered metal bearing or the like is used for the bearing 34, the necessary withstand load may not be obtained and the bearing 34 may break. The bearing 34 supports the rotation shaft 7 together with the bearing 23. A screw toothed worm 8 is formed at a portion of the rotation shaft 7 that passes through the bearing 34 and extends into the gear housing 11. The gear housing 11 includes a worm accommodating recess 11a and a wheel accommodating recess 11b communicating with the worm accommodating recess 11a. The worm 8 is accommodated in the worm accommodating recess 11a, and a circular plate shaped worm wheel is accommodated in the wheel accommodating recess 11b while meshing with the worm 8. The worm 8 and the worm wheel 12 configure a speed reduction mechanism 53 for reducing the rotation speed of the rotation shaft 7. The worm 8 is made of metal. The worm wheel 12 is made of a self-lubricating resin having a linear molecular structure, and is made of POM (polyacetal) or PA (nylon), for example.

A coupling hole 12a is formed at a central part in the radial direction of the worm wheel 12. An output shaft 54 having substantially circular column-shape is arranged in the coupling hole 12a. The output shaft 54 extends in the axial direction of the worm wheel 12 and integrally rotates with the worm wheel 12. A distal end of the output shaft 54 projects to the outside from the gear housing 11. A basal end of a crank arm 55 is fixed to the distal end of the output shaft 54. A vehicle wiper (not shown) is coupled to a distal end of the crank arm 55 by way of a link mechanism (not shown).

Figure 3:
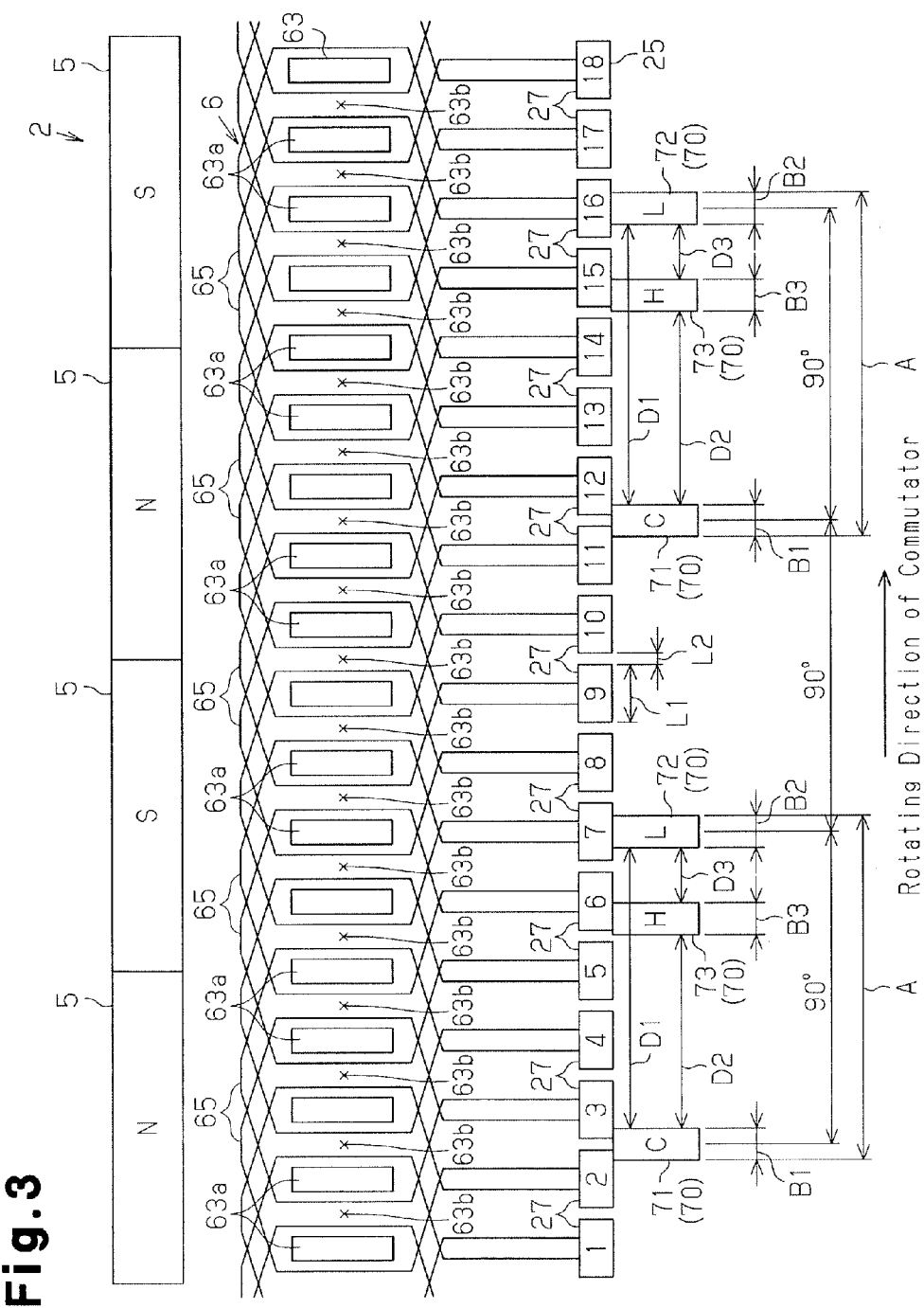
FIG. 3 is a schematic view in which the motor main body of FIG. 1 is developed to a planar form.

FIG. 3 shows a schematic view in which the motor main body and a power supplying brush according to the present embodiment are developed to a planar form.

As shown in FIG. 3, eighteen coils 65 are wound around the teeth 63a in a lap winding manner. Each coil 65 is passed through the slot 63b and wound around the rotor core 63 so as to be arranged across the four teeth 63a lined continuously in the circumferential direction. A winding start end of each coil 65 is connected to one of the segments 27, and a winding finish end of each coil 65 is connected to another segment 27 adjacent in the circumferential direction to the segment 27 to which the winding start end is connected.

The brush holder 32 (see FIG. 2) arranged in the gear unit 3 holds six power supplying brushes 70, each having a square tubular shape and extending in the radial direction. Two of the six power supplying brushes 70 are common brushes 71. Another two brushes are low speed driving brushes 72. The remaining two brushes are high speed driving brushes 73. The brushes 71, 72, 73 are arranged in the order of the common brush 71, the high speed driving brush 73, and the low speed driving brush 72 from the following side toward the preceding side in the rotating direction of the commutator 25. In other words, the high speed driving brush 73 is arranged on the preceding side with respect to the common brush 71 in the rotating direction of the commutator 25, and the low speed driving brush 72 is arranged on the preceding side with respect to the high speed driving brush 73 in the rotating direction of the commutator 25.

Each power supplying brush 70 is biased toward the commutator 25 by a spring or the like (not shown), and the distal end thereof is pushed against the outer peripheral surface (i.e., a side surface on radially outer side of the segment 27) of the commutator 25 in a slidably contacting manner. As shown in FIG. 3, the segment numbers "1" to "18" are given in order in the circumferential direction with respect to the eighteen segments 27. The common brush 71 functions as a positive pole brush, and the low speed driving brush 72 and the high speed driving brush 73 function as negative pole brushes. A pigtail (not shown) is connected to each power supplying brush 70, so that current is supplied to the power supplying brush 70 via such pig tail.

In the motor 1 configured as above, when the current is supplied to the rotor 6 via the common brush 71 and the low speed driving brush 72, the rotor 6 is rotated at low speed. When the current is supplied to the rotor 6 via the common brush 71 and the high speed driving brush 73, the rotor 6 is rotated at high speed faster than at the time of the low speed driving. When the rotor 6 is rotated, the rotation of the rotation shaft 7 is decelerated by the worm 8 and the worm wheel 12 and output from the output shaft 54, whereby the vehicle wiper coupled to the crank arm 55 through the link mechanism is reciprocate turned.

The width in the circumferential direction of the rotation shaft 7 and the arrangement position in the circumferential direction of the rotation shaft 7 of the six power supplying brushes 70 (i.e., two common brushes 71, two low speed driving brushes 72, and two high speed driving brushes 73) will now be described in detail. As shown in FIG. 3, in the motor 1 of the present embodiment, the width in the circumferential direction and the width in the circumferential direction of each brush 71 to 73 are set to repeat a one type short-circuit state (short-circuit state) in which only one type of power supplying brush 70 out of the three types of power supplying brushes 70, which are the common brush 71, the low speed driving brush 72 and the high speed driving brush 73, short circuits two segments 27 adjacent in the circumferential direction and a non-short circuit state in which none of the power supplying brushes 70 short circuits the two segments 27 adjacent in the circumferential direction with the rotation of the rotor 6.

First, in the motor 1, number P of magnetic pole portions of the magnet 5 is set to a value satisfying P≥4, and number of teeth 63a and number of segments 27 are set to the same number. Assuming the number of teeth 63a (i.e., number of segments 27) is S, the value of S is set so that (2S/P) is an odd number. In the present embodiment, P=4 and S=18, and thus (2S/P) is "9", which is an odd number.

With respect to the circumferential direction of the rotation shaft 7, assume a width of the segment 27 is L1, an interval between the adjacent segments 27 is L2, a width of the common brush 71 is B1, a width of the low speed driving brush 72 is B2, and a width of the high speed driving brush 73 is B3. Furthermore, with three brushes 71 to 73 arranged with the high speed driving brush 73 in the middle as one set with respect to the circumferential direction of the rotation shaft 7, assume a width of the arrangement region of one set of brushes 71 to 73 is A, an interval between the common brush 71 and the low speed driving brush 72 with the high speed driving brush 73 in between is D1, an interval between the common brush 71 and the high speed driving brush 73 is D2, and an interval between the high speed driving brush 73 and the low speed driving brush 72 is D3. In this case, each value is set to satisfy the following conditions.

$$B1>L2, B2>L2, B3>L2$$

$$A<(n \times L1+(n+1) \times n2)$$

$$D1>((n-1) \times L1+(n-2) \times L2)$$

$$D2>(n1 \times L1+(n1-1) \times L2)$$

$$D3>(n2 \times L1+(n2-1) \times L2)$$

$$n=n1+n2+1$$

Here, "n" is a number corresponding to the number of segments 27 arranged in an angular range of (360°/P). In other words, "n" is quotient obtained by dividing the number of segments 27 (i.e., same as number S of teeth 63a) arranged in the motor main body 2 with the number P of magnetic pole portions. If the quotient is not an integer, the rounded-up number becomes "n". Now, "n1" and "n2" are positive integers satisfying "n=n1+n2+1". If the number P of magnetic pole portions of the magnet 5 is "4" and the number of segments 27 is "18" as in the present embodiment, for example, n=5, n1=2, n2=2 are set.

In the present embodiment, the common brush 71, the low speed driving brush 72, and the high speed driving brush 73 have the width in the circumferential direction and the arrangement position in the circumferential direction set to satisfy the above conditions. The width B1, B2, B3 in the circumferential direction of each brush 71 to 73 is the same value and is narrower than the width in the circumferential direction of the segment 27. The common brush 71 and the low speed driving brush 72 arranged with the high speed driving brush 73 in between are arranged at an interval of 90° same as the angular interval between the adjacent magnetic pole portions of the magnet 5.

The worm 8 and the worm wheel 12 of the present embodiment are set such that the pressure angle of the worm 8 is greater than the pressure angle of the worm wheel 12. With respect to the worm and the worm wheel in which the number of meshing teeth is always n+1 or changed between n+1 and n (n is a natural number) by rotation under the condition in which the pressure angle of the worm and the worm wheel are the same with respect to each other, the pressure angle of the worm 8 is set to be greater than the pressure angle of the worm wheel 12 such that the maximum number of meshing teeth becomes smaller than or equal to n.

Figure 4A:
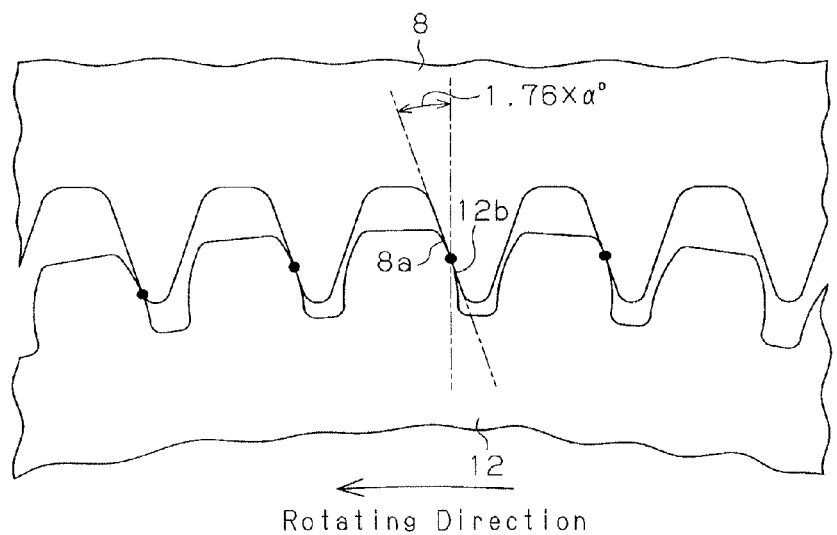
FIGS. 4(a) and 4(b) are partially enlarged schematic views of the speed reduction mechanism of FIG. 1.
Figure 4B:
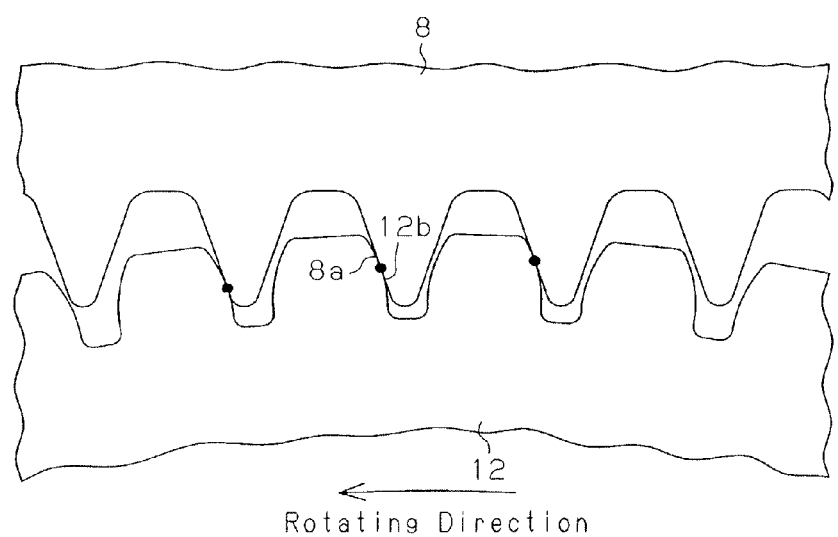
Figure 5A:
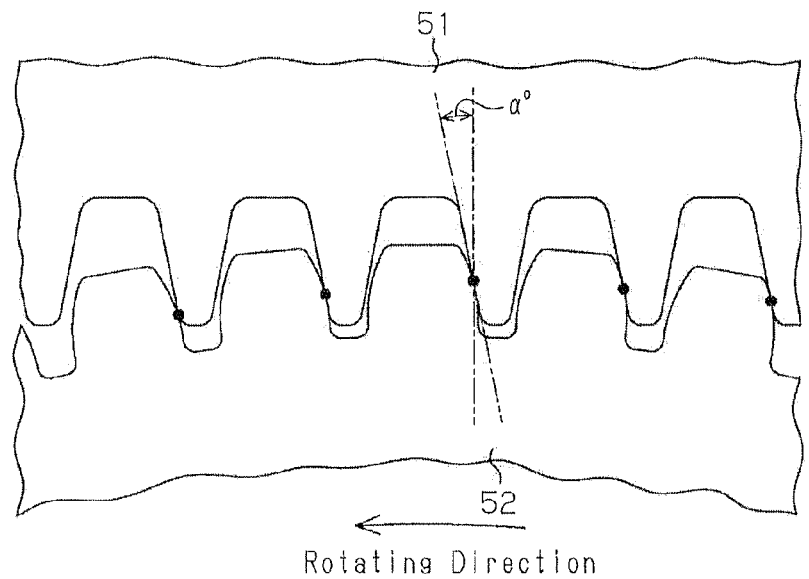
FIGS. 5(a) and 5(b) are partially enlarged schematic views of a speed reduction mechanism according to the prior art.
Figure 5B:
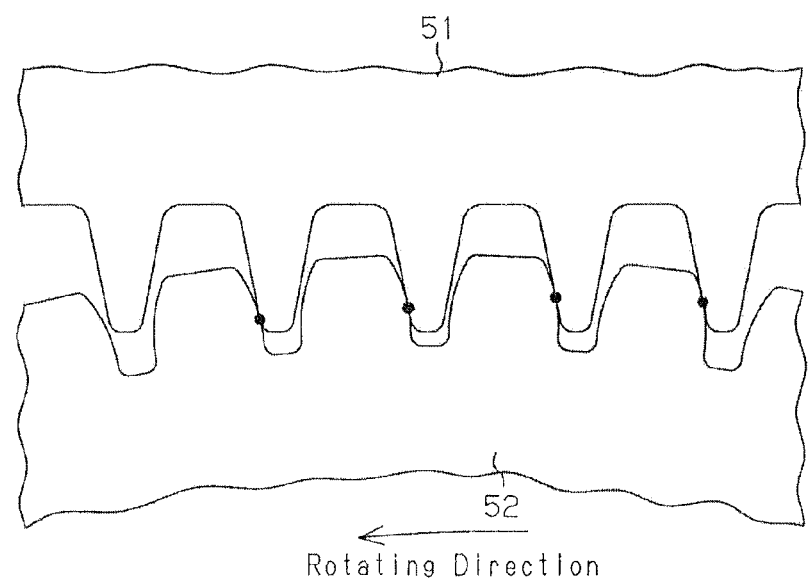

Specifically, with the worm 51 and the worm wheel 52 shown in FIG. 5(*a*) and FIG. 5(*b*), the pressure angles are both α°, and the number of meshing teeth is changed between five (see FIG. 5(*a*)) and four (see FIG. 5(*b*)) by rotation (average number of meshing teeth is 4.1). The worm 8 and the worm wheel 12 shown in FIG. 4(*a*) and FIG. 4(*b*) are obtained by changing the pressure angles of the worm 51 and the worm wheel 52. In other words, the pressure angle of the worm 8 is set to be greater than the pressure angle of the worm wheel 12 such that the maximum number of meshing teeth becomes smaller than or equal to four. In the present embodiment, the pressure angle of the worm wheel 12 is set to α° and the pressure angle of the worm 8 is set to 1.76×α°, so that the maximum number of meshing teeth is four and the average of the number of meshing teeth is 3.7. In other words, in the present embodiment, a period (angle) in which the number of meshing teeth where the tooth 8*a* of the worm 8 and a tooth 12*b* of the worm wheel 12 mesh with each other (make contact) is four as shown in FIG. 4(*a*) occupies 70 percent, and a period (angle) in which the number of meshing teeth is three as shown in FIG. 4(*b*) occupies 30 percent. When setting the pressure angle of the worm 8 large (to 1.76×α° in the present embodiment) so that the maximum number of meshing teeth becomes smaller than or equal to four, a normal pitch is the same as when the pressure angle is α°. The pressure angle (1.76×α°) of the worm 8 of the present embodiment is set to a maximum angle while satisfying the relationship of the worm 8 and the worm wheel 12 (relationship of so-called worm gear). With such maximum angle, the tooth tip of the worm 8 becomes a triangular shape from a trapezoidal shape, but the diameter of the worm 8 does not become small. The pressure angle of the worm 8 in which the number of meshing teeth is always four is 1.2×α°. In FIG. 4 and FIG. 5, the meshing (contacting) area is illustrated with a black circle so that meshing (contacting) can be easily recognized visually.

Figure 6:
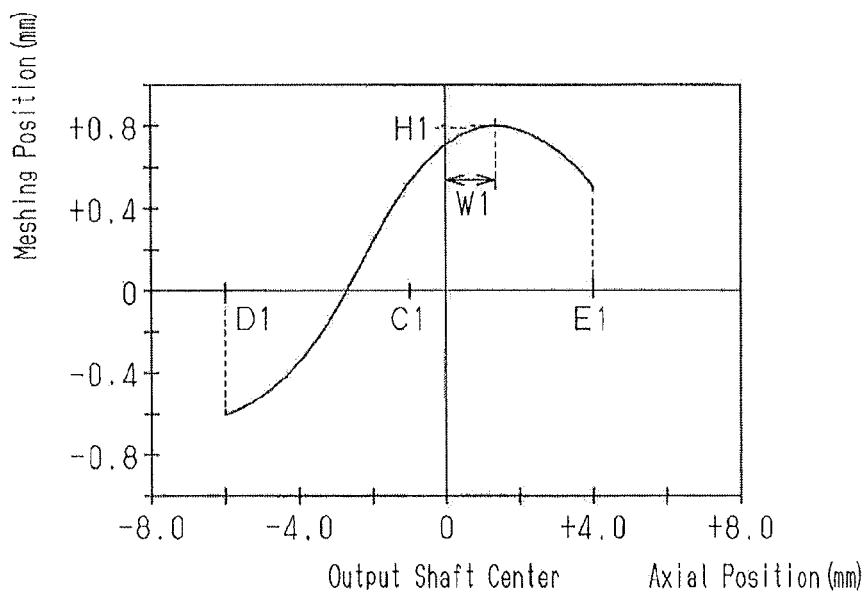
FIG. 6 is a graph showing a relationship between an axial position and a meshing position in a worm of the speed reduction mechanism of FIG. 4.
Figure 7:
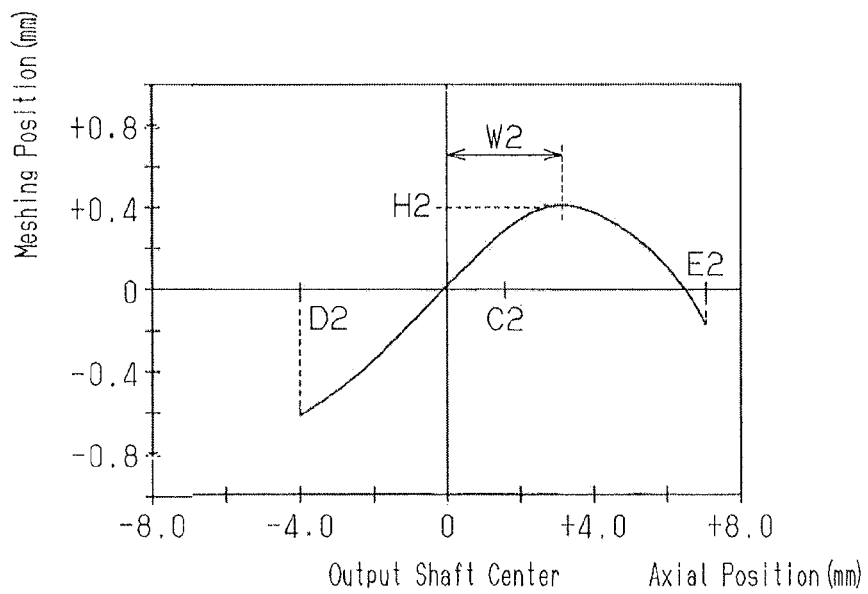
FIG. 7 is a graph showing a relationship between an axial position and a meshing position in a worm of the conventional speed reduction mechanism of FIG. 5.

In the present embodiment, the worm 8 is made of metal and the worm wheel 12 is made of resin. FIG. 6 shows the relationship of the axial position and the meshing position in the worm 8 of the speed reduction mechanism 53 of FIG. 4. In other words, FIG. 6 shows the meshing properties in the speed reduction mechanism 53 in which the worm 8 is made of metal and the worm wheel 12 is made of resin, and the pressure angle of the worm 8 is greater than the pressure angle of the worm wheel 12. FIG. 7 shows a relationship of the axial position and the meshing position in the worm 51 of the conventional speed reduction mechanism of FIG. 5. In other words, FIG. 7 shows the meshing properties in the speed reduction mechanism in which the worm 51 is made of metal and the worm wheel 52 is made of resin, and the pressure angles of the worm 51 and the worm wheel 52 are the same with respect to each other. In FIG. 6 and FIG. 7, the "axial position" indicates the axial position of the worm, and the "meshing position" indicates the meshing position of the worm and the worm wheel as the position in the radial direction of the worm. The "output shaft center" indicates the position of a line orthogonal to the axis line of the worm and passing through the axis line of the worm wheel, in the axial direction of the worm. The value of the "meshing position" becomes greater the more the gearing position is closer to a tooth base of the worm.

If both the worm and the worm wheel are made of metal, the deformation of the worm and the worm wheel is barely tolerated when the worm and the worm wheel mesh with each other. In this case, the meshing position takes a maximum value at the output shaft center and the meshing positions at the start of meshing and the end of meshing take substantially the same values in the graph showing the relationship of the axial position and the meshing position.

If the worm is made of metal and the worm wheel is made of resin, the deformation of the worm wheel is tolerated when the worm and the worm wheel mesh with each other. In this case, the range of the axial position between the start of meshing and the end of meshing becomes wide compared to when the worm and the worm wheel are both made of metal in the graph showing the relationship of the axial position and the meshing position.

As shown in FIG. 7, in the conventional speed reduction mechanism, an axial position E2 of the start of meshing of the worm 51 and the worm wheel 52 is relatively spaced apart with respect to an output shaft center 0, so that an axial position D2 of the end of meshing becomes relatively close with respect to the output shaft center 0 by such amount. Furthermore, a maximum value H2 of the meshing position is relatively small, and an interval W2 between the position of the maximum value H2 and the output shaft center 0 is relatively large. In addition, a middle C2 of the range from the axial position E2 of the start of meshing to the axial position D2 of the end of meshing is positioned on the axial position E2 side of the start of meshing with respect to the output shaft center 0.

As shown in FIG. 6, in the speed reduction mechanism 53 of the present embodiment, the axial position E1 of the start of meshing of the worm 8 and the worm wheel 12 is closer with respect to the output shaft center 0 and the axial position D1 of the end of meshing is farther away with respect to the output shaft center 0 compared to the conventional speed reduction mechanism. Furthermore, a maximum value H1 of the meshing position is larger compared to the conventional speed reduction device, and an interval W1 between the position of the maximum value H1 and the output shaft center 0 is smaller compared to the conventional speed reduction device. In addition, the middle C1 of the range from the axial position E1 of the start of meshing to the axial position D1 of the end of meshing is positioned on the axial position D1 side of the end of meshing with respect to the output shaft center 0.

The characteristic advantages of the present embodiment will be described below.

(1) With the worm and the worm wheel in which the number of meshing teeth is changed between five and four by rotation under the condition in which the pressure angles of the worm and the worm wheel are the same (both are $\alpha°$) with respect to each other, the surface pressure with respect to each tooth lowers when the number of meshing teeth increases to five, whereby the friction coefficient increases and the power loss at the meshing portion increases. In the present embodiment, however, the pressure angle of the worm 8 is set to be greater than the pressure angle of the worm wheel 12 so that the maximum number of meshing teeth becomes smaller than or equal to four, and hence the number of meshing teeth will not be five. Thus, the power loss can be reduced, and furthermore, the rotation transmission efficiency can be enhanced. In other words, the surface pressure with respect to each tooth increases when the number of meshing teeth is reduced as in the present embodiment, whereby the friction coefficient lowers and the power loss at the meshing portion can be reduced, and furthermore, the rotation transmission efficiency can be enhanced. Therefore, the efficiency of the motor 1 with the speed reduction mechanism can be enhanced. The speed reduction mechanism (motor 1 with speed reduction mechanism) with satisfactory rotation transmission efficiency can be easily manufactured with the manufacturing method of setting the pressure angle of the worm 8 in the above manner.

(2) The pressure angle of the worm 8 is set to $1.76\times\alpha°$, which is the maximum angle, while satisfying the relationship of the worm 8 and the worm wheel 12, that is, within a range in which the worm 8 and the worm wheel 12 function as the worm gear, and hence an average of the number of meshing teeth can be a minimum or 3.7. Thus, the power loss can be greatly reduced, and furthermore, the rotation transmission efficiency can be greatly enhanced.

(3) The worm wheel 12 is made of a self-lubricating resin having a linear molecular structure, so that the molecules at the surface of the worm wheel 12 are linearly lined along the direction of the pressure from the worm 8 when pressure is applied from the worm 8, and friction is further reduced with respect to the pressure direction. Therefore, the power loss by the kinetic friction can be greatly reduced and the rotation transmission efficiency can be further enhanced.

The above-described embodiment may be modified as below.

In the embodiment described above, the speed reduction mechanism in which the number of meshing teeth is changed between five and four by rotation under the condition in which the pressure angles of the worm 8 and the worm wheel 12 are both $\alpha°$ is described. With respect to the speed reduction mechanism in which the number of meshing teeth is always n+1 or changed between n+1 and n (n is a natural number) by rotation under the condition in which the pressure angles are the same with respect to each other, the pressure angle of the worm 8 is to be set so that the maximum number of meshing teeth is smaller than or equal to n. For instance, with respect to the speed reduction mechanism in which the number of meshing teeth is changed between six and five by rotation under the condition in which the pressure angles of the worm and the worm wheel are the same with respect to each other, the pressure angle of the worm 8 is to be set so that the maximum number of meshing teeth is smaller than or equal to five. Furthermore, for instance, with respect to the speed reduction mechanism in which the number of meshing teeth is changed between four and three by rotation under the condition in which the pressure angles of the worm and the worm wheel are the same with respect to each other, the pressure angle of the worm 8 is to be set so that the maximum number of meshing teeth is smaller than or equal to three. In all cases, the power loss can be reduced, and furthermore, the rotation transmission efficiency can be enhanced.

In the embodiment described above, the pressure of the worm 8 is set to $1.76\times\alpha°$, but is not limited thereto. With respect to the speed reduction mechanism in which the number of meshing teeth is always n+1 or changed between n+1 and n (n is a natural number) by rotation under the condition the pressure angles are the same with respect to each other, the pressure angle of the worm 8 may be appropriately changed as long as the pressure angle of the worm 8 is set so that the maximum number of meshing teeth becomes smaller than or equal to n. In other words, the pressure angle of the worm 8 may be set to smaller than or equal to $1.76\times\alpha°$ (e.g., $1.5\times\alpha°$, $1.2\times\alpha°$, etc.), which is the maximum angle while satisfying the relationship of the worm 8 and the worm wheel 12 (within a range the worm 8 and the worm wheel 12 function as the worm gear). If the pressure angle of the worm wheel is changed to other than $\alpha°$, the pressure angle of the worm satisfying the condition will, of course, change. In this case as well, the average of the number of meshing teeth can be minimized by having the pressure angle of the worm as a maximum angle while satisfying the relationship of the worm and the worm wheel, whereby the power loss can be greatly reduced and furthermore, the rotation transmission efficiency can be greatly enhanced.

Figure 8A:
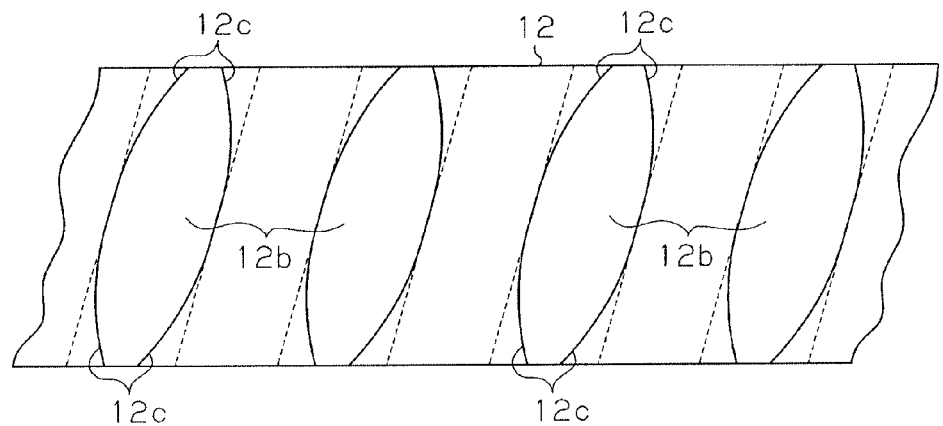
FIG. 8(a) is a partially enlarged schematic view of a worm wheel in a further example as viewed from a radially outer side.

In the embodiment described above, the shape of the tooth 12b of the worm wheel 12 may be a shape formed with a cutout 12c on both ends in the axial direction when seen from the radially outer side, as shown in FIG. 8(a). Specifically, both ends in the axial direction of the tooth 12b of the worm wheel 12 may have a shape (shape formed with the cutout 12c) scraped so that the width becomes narrower towards the end in the axial direction, as opposed to a simple linear shape shown with a broken line in FIG. 8(a) when seen from the radially outer side. With such shape, the friction coefficient can be reduced by reduction in the contacting area and the friction coefficient can be further reduced while realizing satisfactory circumvention of the lubricating oil with the cutout 12c.

Figure 8B:
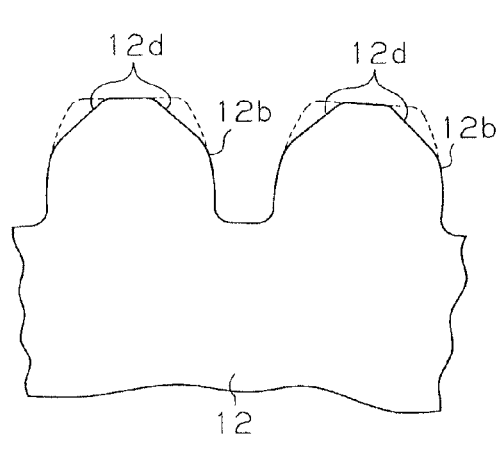
FIG. 8(b) is a partially enlarged schematic view of the worm wheel in a further example as viewed from an axial direction.

In the embodiment described above, the distal end shape of the tooth 12b of the worm wheel 12 may be a shape formed with a cutout 12d so as to be tapered when seen from the axial direction, as shown in FIG. 8(b). Specifically, the distal end of the tooth 12b of the worm wheel 12 may have a shape (shape formed with the cutout 12d) scraped so as to be tapered, that is, the width rapidly becomes narrow, as opposed to a simple smooth curved shape shown with a broken line in FIG. 8(b) when seen from the axial direction. With such shape, the friction coefficient can be reduced by reduction in the contacting area and the friction coefficient can be further reduced while realizing satisfactory circumvention of the lubricating oil with the cutout 12d.

Figure 8C:
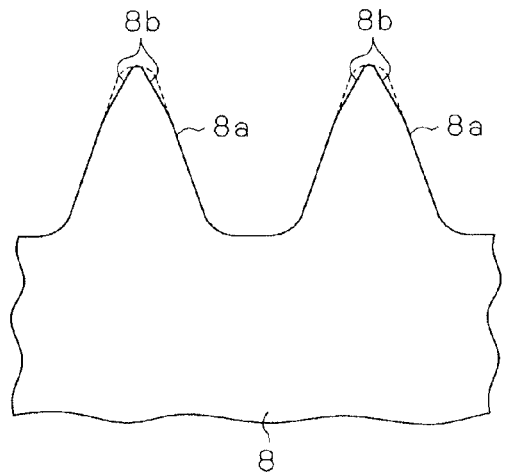
FIG. 8(c) is a partially enlarged schematic view of a worm in a further example as viewed from the axial direction.

In the embodiment described above, the distal end shape of the tooth 8a of the worm 8 may be a shape formed with a cutout 8b so as to be tapered when seen from the direction orthogonal to the axis, as shown in FIG. 8(c). Specifically, the distal end of the tooth 8a of the worm 8 may have a shape (shape formed with the cutout 8b) scraped so as to be tapered, that is, the width rapidly becomes narrow, as opposed to a simple linear shape shown with a broken line in FIG. 8(c) when seen from the direction orthogonal to the axis. With such shape, the friction coefficient can be reduced by reduction in the contacting area and the friction coefficient can be further reduced while realizing satisfactory circumvention of the lubricating oil with the cutout 8b.

In the embodiment described above, the invention of the present application is embodied in the motor 1 with the speed reduction mechanism including the speed reduction mechanism (worm 8 and worm wheel 12) and the motor main body 2 for rotatably driving the worm 8, but may be embodied as a speed reduction mechanism used in another device not including the motor main body 2.

While the invention has been described in detail and with reference to specific embodiments thereof, it will be apparent to one skilled in the art that various changes and modifications can be made therein without departing from the spirit and scope thereof.

What is claimed is:

1. A speed reduction mechanism comprising:
a worm comprising metal; and
a worm wheel comprising a self-lubricating resin, wherein,
the worm wheel meshes with the worm,
an imaginary line extends orthogonal to an axis of the worm from an axis of the worm wheel,
the axis of the worm wheel being referred to as an output shaft center, and
a pressure angle of the worm at a meshing position on the imaginary line is set to be greater than a pressure angle of the worm wheel at the meshing position on the imaginary line so that a middle of a range from a start of meshing to an end of meshing is positioned closer to the end of meshing with respect to the output shaft center in an axial direction of the worm.

2. A motor comprising:
the speed reduction mechanism according to claim 1; and
a motor main body for rotatably driving the worm.

3. A speed reduction mechanism comprising:
a worm comprising metal; and
a worm wheel comprising a self-lubricating resin, wherein,
the worm wheel meshes with the worm,
an imaginary line extending orthogonal to an axis of the worm from an axis of the worm wheel,
the axis of the worm wheel being referred to as an output shaft center,
a pressure angle of the worm at a meshing position on the imaginary line is set to be greater than a pressure angle of the worm wheel at the meshing position on the imaginary line, and
a range of the pressure angle of the worm at the meshing position varies between 1.2× to 1.76× of the pressure angle of the worm wheel at the meshing position.

4. A motor comprising:
the speed reduction mechanism according to claim 3; and
a motor main body for rotatably driving the worm.

5. A speed reduction mechanism comprising:
a worm comprising metal; and
a worm wheel comprising a self-lubricating resin, wherein,
the worm wheel meshes with the worm,
a meshing position between the worm and the worm wheel varies in a radial direction of the worm in accordance with an axial direction of the worm between a start of meshing and an end of meshing, the meshing position having a maximum position in the radial direction of the worm between the start of meshing and the end of meshing,
an imaginary line extends orthogonal to an axis of the worm from an axis of the worm wheel,
the axis of the worm wheel is referred to as an output shaft center, and
a pressure angle of the worm at a meshing position on the imaginary line is set to be greater than a pressure angle of the worm wheel at the meshing position on the imaginary line so that the meshing position on the imaginary line is positioned closer to the maximum position with respect to the meshing position at the start of meshing in the radial direction of the worm.

6. A motor comprising:
the speed reduction mechanism according to claim 5; and
a motor main body for rotatably driving the worm.

* * * * *